United States Patent
Makhlouf et al.

(10) Patent No.: US 7,072,783 B2
(45) Date of Patent: Jul. 4, 2006

(54) FREQUENCY AND TIMING ERROR ESTIMATION AND CORRESPONDING CHANNEL CHARACTERIZATION IN A COMMUNICATION SYSTEM

(75) Inventors: Isam R. Makhlouf, Elk Grove Village, IL (US); Steven C. Jasper, Hoffman Estates, IL (US)

(73) Assignee: Motorola, Inc., Schaumburg, IL (US)

( * ) Notice: Subject to any disclaimer, the term of this patent is extended or adjusted under 35 U.S.C. 154(b) by 100 days.

(21) Appl. No.: 10/782,448

(22) Filed: Feb. 19, 2004

(65) Prior Publication Data
US 2005/0125176 A1   Jun. 9, 2005

Related U.S. Application Data

(60) Provisional application No. 60/526,630, filed on Dec. 3, 2003.

(51) Int. Cl.
*G01R 29/26* (2006.01)
(52) U.S. Cl. ...................................................... 702/69
(58) Field of Classification Search ................ 375/224, 375/227, 340, 350; 702/69, 70, 75, 79, 106, 702/176, 189–191, 193, 195; 324/76.19, 324/620, 76.22, 622
See application file for complete search history.

(56) References Cited

U.S. PATENT DOCUMENTS

| 5,343,499 A | 8/1994 | Jasper et al. | |
|---|---|---|---|
| 5,793,250 A * | 8/1998 | Fukushi | 329/307 |
| 6,249,180 B1 * | 6/2001 | Maalej et al. | 329/304 |
| 6,441,786 B1 | 8/2002 | Jasper et al. | |
| 6,546,057 B1 | 4/2003 | Yeap | |
| 2003/0185326 A1 | 10/2003 | Kolze | |
| 2004/0196915 A1 | 10/2004 | Gupta | |

* cited by examiner

*Primary Examiner*—John Barlow
*Assistant Examiner*—Cindy D. Khuu
(74) *Attorney, Agent, or Firm*—Valerie M. Davis (57) ABSTRACT

A method for determining a frequency error over at least one frequency search space for a received signal, the method including the steps of: calculating a first noise estimation for a first frequency offset in a frequency search space; calculating at least a second noise estimation for a second frequency offset in the frequency search space; and determining a minimum noise estimation from the calculated noise estimations, wherein the frequency error is the frequency offset corresponding to the minimum noise estimation.

23 Claims, 8 Drawing Sheets

FREQUENCY AND TIMING ERROR ESTIMATION AND CORRESPONDING CHANNEL CHARACTERIZATION IN A COMMUNICATION SYSTEM

This application claims benefit of 60/526,630 filed on Dec. 3, 2003.

FIELD OF THE INVENTION

The present invention relates generally to communication systems, and more specifically to a method and apparatus for determining a frequency error and timing synchronization error of a received signal and of determining a corresponding channel estimation filter design.

BACKGROUND OF THE INVENTION

The tremendous growth of the wireless and mobile user population, coupled with the bandwidth requirements of multimedia applications, calls for efficient use of the scarce radio spectrum allocated to wireless and mobile communications. The deployment of efficient modulation schemes, such as quadrature amplitude modulation, or QAM, which uses less bandwidth than other types of modulation such as FM or AM, is therefore a common practice in modern communication systems.

QAM is well known in the communications art and combines characteristics of both phase modulation and amplitude modulation to reduce the bandwidth required to carry a certain amount of information in an information-bearing signal. In QAM, information is conveyed using changes in both the amplitude of a carrier wave and the relative phase angle of the carrier signal with respect to a reference angle. Using QAM modulation to convey digital data, 2, 3, 4, or more, bits of digital information can be conveyed per QAM signal element.

Multi-carrier QAM is a technique in which an information-bearing signal, such as serial digitized voice or digital data from a computer or other machine for example, is divided up into multiple, separate, frequency division multiplexed QAM signals. Each QAM signal occupies a discrete frequency band (with each of the bands being substantially frequency adjacent to the others) and carries a portion of the information in the information-bearing signal. Multi-carrier QAM may further support several channel bandwidths. One well-known form of multi-carrier QAM is Orthogonal Frequency Division Multiplexing (OFDM). A chief advantage of multi-carrier techniques is their improved performance in time-dispersive channels relative to single-carrier methods.

Figure 1:
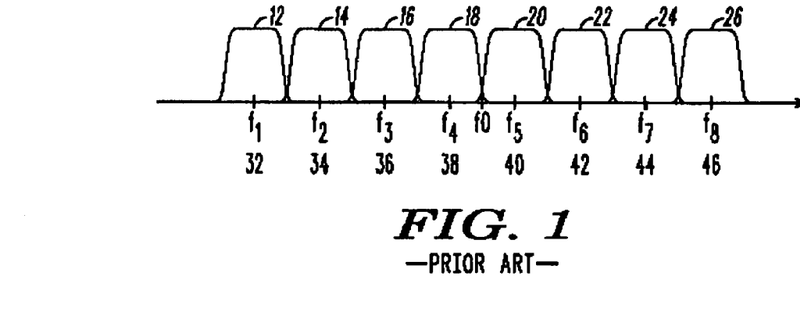
FIG. 1 illustrates a diagram of a transmit energy spectrum output from a transmitter in a multi-carrier QAM based communications system.

FIG. 1 illustrates a representation of a transmit energy spectrum, i.e., a radio frequency ("RF") signal, output from a transmitter in a multi-carrier QAM based communications system. The frequency spectrum output is shown as having eight sub-channels 12, 14, 16, 18, 20, 22, 24 and 26 centered about a center frequency $f_0$. Moreover, each sub-channel 12, 14, 16, 18, 20, 22, 24 and 26 has its own center frequency $f_0+f_1$, $f_0+f_2$, $f_0+f_3$, $f_0+f_4$, $f_0+f_5$, $f_0+f_6$, $f_0+f_7$, and $f_0+f_8$ respectively (i.e., 32, 34, 36, 38, 40, 42, 44 and 46 respectively). While FIG. 1 illustrates a transmit energy spectrum having eight sub-channels, it is appreciated by those skilled in the art that the frequency spectrum may have more or fewer sub-channels, for instance 4, 16 or 24 sub-channels and that the number of sub-channels typically corresponds to a given channel bandwidth. Moreover, it is further understood that the number of sub-channels may be an even number of sub-channels as illustrated in FIG. 1 or may, alternatively, be an odd number of sub-channels.

Figure 2:
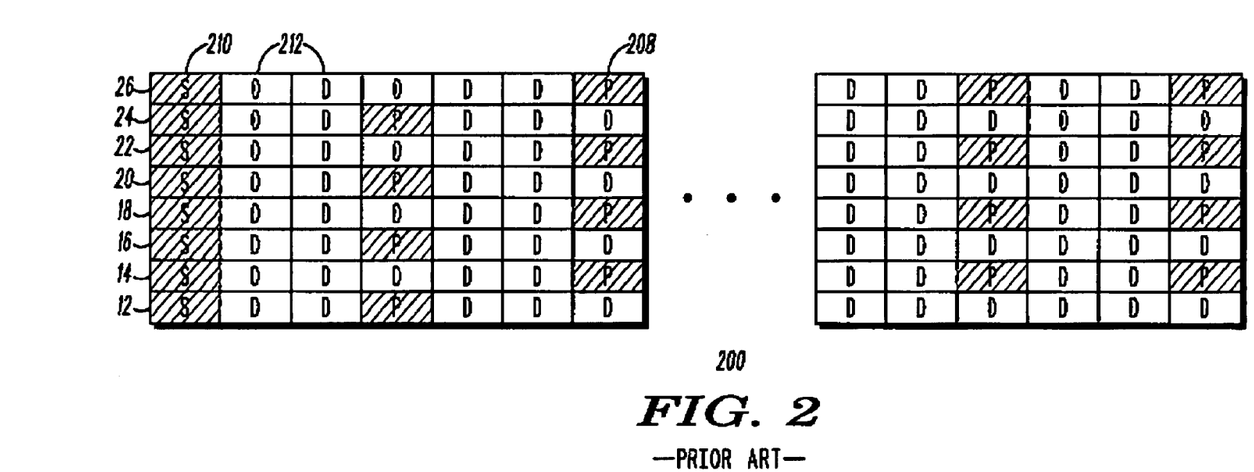
FIG. 2 illustrates an example slot format for a pilot-symbol assisted multi-carrier QAM signal.

FIG. 2 illustrates an exemplary slot format 200 comprising information that might be present on each of the eight sub-channels shown in FIG. 1. In slot format 200, the horizontal dimension is indicative of time, and the vertical dimension of frequency. Each of the signals 12, 14, 16, 18, 20, 22, 24 and 26 at frequencies $f_1$, $f_2$, $f_3$, $f_4$, $f_5$, $f_6$, $f_7$, and $f_8$, respectively, includes non-data symbols (pilot symbols 208 and synchronization symbols 210) and data symbols 212. Each of the non-data symbols 208, 210 are disposed among the data symbols 212 at a plurality of pre-designated locations/times that are known to an intended receiver in the multi-carrier QAM based communications system and can therefore be used for timing synchronization and frequency synchronization, as well as channel estimation, by the receiver. The data symbols 212 constitute the information to be communicated via the transmission.

Figure 3:
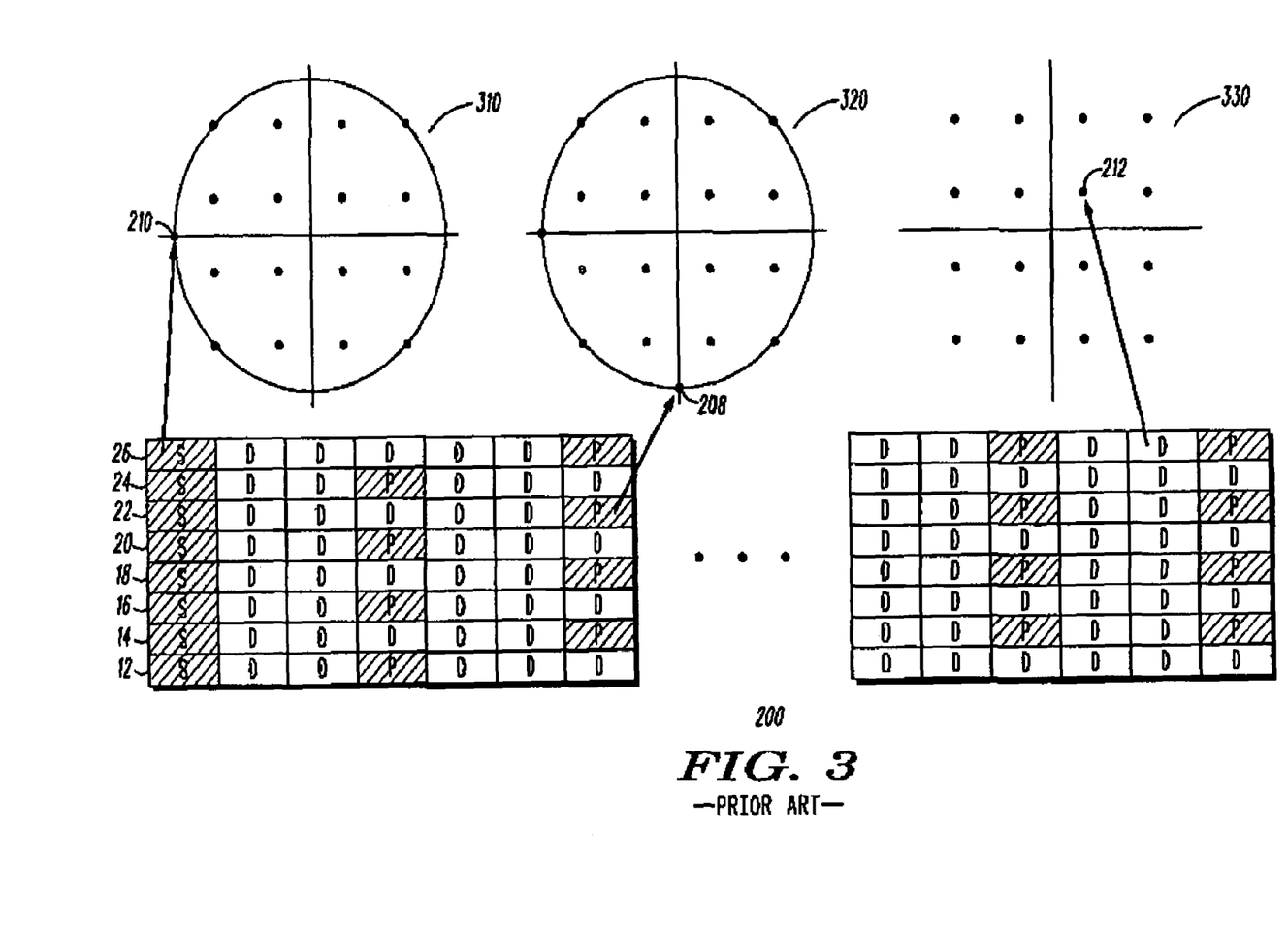
FIG. 3 illustrates an example of a phase and amplitude mapping of each of the symbol types illustrated in FIG. 2.

FIG. 3 illustrates exemplary phase and amplitude mappings of each of the symbol types present in the slot format of FIG. 2. Map 310 is a phase and amplitude mapping for a synchronization symbol 210, and map 320 is a phase and amplitude mapping for a pilot symbol 208. Synchronization symbol mappings and pilot symbol mappings can be arbitrarily chosen, though typically they have identical amplitudes as illustrated by the circle loci shown in maps 310 and 320. All that is necessary is that their phase and amplitude values, in addition to their locations, be predetermined and known to the receiver. Map 330 is a phase and amplitude mapping for a data symbol 212. This exemplary data symbol map represents a 16QAM constellation capable of conveying 4 bits of information per symbol. Since the data symbols 212 represent four-bit binary words, there are sixteen (16) possible different vectors or symbols that correspond to the 16 different binary values. Every possible bit pattern is assigned a location on the coordinate system shown in map 330. A complex vector, having a magnitude corresponding to its length, and a phase angle corresponding to its angular displacement from a reference axis, represent the bits that it "points" to at a particular constellation point.

A typical receiver in a multi-carrier QAM based communications system comprises conventional apparatus (e.g., a digital signal processor that includes a demodulator portion) for performing a timing synchronization method for detecting the presence of the synchronization symbols 210 and determining from these symbols the proper sampling timing for one or more sampling devices in the receiver and the times at which each of the pilot, synchronization and data symbols 208, 210 and 212 in a given slot 200 will arrive. In this conventional timing synchronization methodology or algorithm (also referred to herein as "coarse timing synchronization"), a comparison, or correlation is made between the received digital signal samples and the known waveform produced by the synchronization symbols 210. The timing corresponding to the best match between the received signal and the known waveform determines the relative timing of the synchronization symbols. From this, a coarse timing estimate is derived for use in demodulation and bit detection for that slot. If timing estimates for multiple slots are available, these may be further averaged to improve the timing estimate.

A typical receiver in a multi-carrier QAM based communications system further comprises conventional apparatus (e.g., a digital signal processor that includes a demodulator portion) for performing an automatic frequency correction (AFC) methodology for determining and correcting an offset of the center frequency $f_0$. An offset between the expected and actual center frequency of a received signal can occur due to such factors as oscillator drift or Doppler shift caused by relative movement between transmitter and receiver. This offset can degrade system performance, as will be explained shortly.

A conventional frequency correction methodology or algorithm (also referred to herein as "coarse frequency correction") makes use of complex channel gain estimates derived from synchronization and pilot samples near the beginning of the slot. For each sub-channel, the channel phase differences between adjacent synchronization and pilot sample pairs are calculated, which, coupled with the corresponding time differences, provide frequency error information. A weighted average of the frequency error values, over several sample pairs and sub-channels, defines a frequency error estimate for that slot. If frequency error estimates for multiple slots are available, these may be further averaged to improve the frequency estimate.

The conventional timing synchronization methodology and frequency correction methodology may be adequate in situations where long-term averaging of time and frequency estimates over multiple slots is possible. However, the accuracy of conventionally derived timing and frequency estimates may be inadequate if the transmitter transmits only a single isolated slot (for example, a random access request), or only a few slots. Taking timing synchronization as an example, synchronization symbols typically occupy only a short portion of each slot, and the timing information that is conventionally derived therefrom may not be sufficiently accurate, or adequately representative, of the composite timing as experienced over the slot's entire duration. Moreover, even if long-term averaging is possible, conventional timing and frequency estimators typically converge to the centroids of respective delay and Doppler profiles of what may be a multi-path fading channel. This may lead to degraded channel estimation performance for non-symmetric delay and Doppler profiles.

In addition, a typical receiver in a multi-carrier QAM based communications system employs pilot-symbol assisted channel amplitude and phase (complex gain) estimation at the data symbol 212 locations. This is accomplished by first calculating the complex channel gains at the known pilot and synchronization symbol 208 and 210 locations, as previously mentioned, for reference. A filtering or interpolation operation is then applied to these complex channel gains to estimate the complex channel gain at each data symbol 212 location. These complex channel gain estimates are then applied to undo the effect of the channel on the transmitted data symbols. The channel estimation may be carried out using one-dimensional filtering (for example, via a set of channel estimation filters with a separate time-domain filtering operations for each sub-channel, and using only the pilot and synchronization symbols on that sub-channel), or using two-dimensional filtering, where the set of pilot/synchronization symbols utilized for the channel estimate for each sub-channel spans multiple sub-channels and symbol times.

It is further known by those of ordinary skill in the art that selecting from multiple channel estimation filters, with Doppler and/or delay designs carefully selected to match the expected range of channel conditions, can improve performance (e.g., receiver sensitivity) by minimizing estimation error. The key to this adaptive methodology is accurate classification of the channel, which can be compromised due to residual timing and/or frequency offsets remaining after coarse timing synchronization and frequency corrections are applied. These residual offsets result in a shifting (or un-centering) of the multi-path channel response (or the delay/Doppler profile thereof) relative to the channel estimation filter bandwidths and can result in wider than actual channel classification. This, in turn, can result in the selection of a wider than necessary channel estimation filter design, which nullifies the sensitivity improvement that could be achieved with a narrower design. Worse yet, these residual timing and frequency errors can result in cases where even the widest available channel estimation filter (or, in the case of a system not employing a multiple filter sensitivity improvement methodology, the only available channel estimation filter) is not wide enough. The result here can be more severe than a mere surrender of sensitivity improvement, as data recovery may not be possible.

Thus, there exists a need for a method and apparatus for performing timing and frequency error estimation and correction to determine and remove residual errors remaining after the coarse frequency and timing corrections are made. It is further desirable that this method and apparatus be compatible with and enhance the performance of a system that utilizes an adaptive channel estimation scheme.

BRIEF DESCRIPTION OF THE FIGURES

A preferred embodiment of the invention is now described, by way of example only, with reference to the accompanying figures in which.

DETAILED DESCRIPTION OF THE INVENTION

While this invention is susceptible of embodiments in many different forms, there are shown in the figures and will herein be described in detail specific embodiments, with the understanding that the present disclosure is to be considered as an example of the principles of the invention and not intended to limit the invention to the specific embodiments shown and described. Further, the terms and words used herein are not to be considered limiting, but rather merely descriptive. It will also be appreciated that for simplicity and clarity of illustration, elements shown in the figures have not necessarily been drawn to scale. For example, the dimensions of some of the elements are exaggerated relative to each other. Further, where considered appropriate, reference numerals have been repeated among the figures to indicate corresponding elements.

Figure 4:
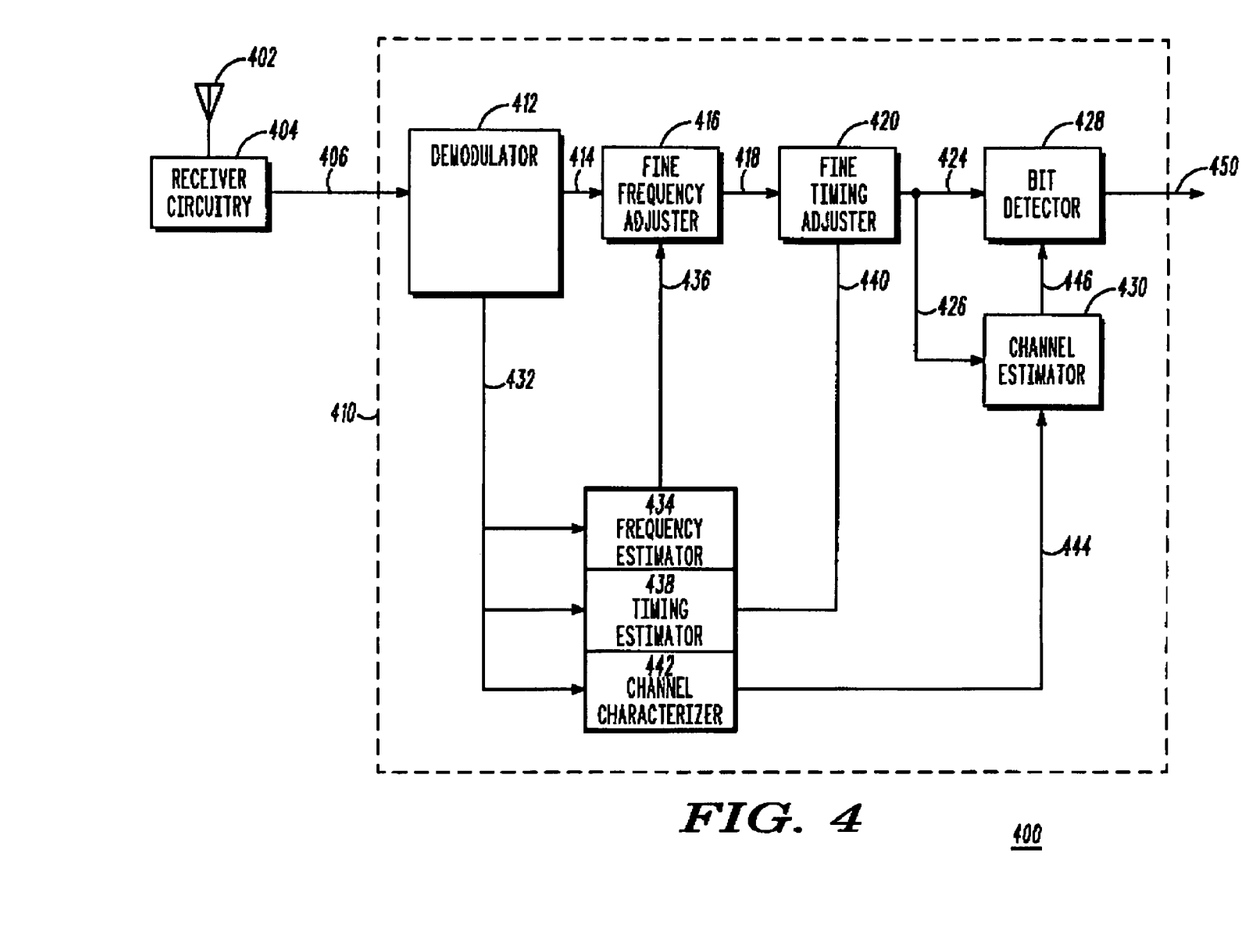
FIG. 4 illustrates a block diagram of a receiver system in accordance with an embodiment of the present invention.

FIG. 4 illustrates a block diagram of a receiver system 400 in accordance with an embodiment of the present invention. Receiver 400 comprises an antenna element 402 for receiving a signal transmitted from a transmitter in a multi-carrier communication system, such as a QAM based system, wherein the transmitted signal may have a format in accordance with the transmit signal illustrated in FIG. 1. Receiver 400 further includes conventional receiver circuitry 404, as is well known in the art, for converting the received analog RF signal into a digital baseband signal 406 that is then processed in a digital signal processor ("DSP") 410 of the receiver.

The DSP ideally includes a demodulator 412, a fine frequency adjustor 416 in accordance with the present invention, a fine timing adjustor 420 in accordance with the present invention, a conventional bit detector 428, a channel estimator 430 in accordance with the present invention, a frequency estimator 434 in accordance with the present invention, a timing estimator 438 in accordance with the present invention and a channel characterizer 442 in accordance with the present invention.

DSP 410 ideally processes the baseband signal 406 as follows. The demodulator 412 demodulates signal 406, i.e., separates the digital baseband signal into the sub-channel signals 12, 14, 16, 18, 20, 22, 24 and 26, each having information in accordance with the slot format illustrated in FIG. 2. In effect, demodulator 412 comprises a bank of demodulators, one for each sub-channel. Each sub-channel demodulator further comprises a complex mixer for translating its particular sub-channel signal to substantially zero frequency, a low pass filter for pulse shaping and rejection of the other sub-channel signals, and a symbol-rate sampler for producing samples 414 of the demodulated symbols at the appropriate timing instants.

Demodulator 412 may provide for a coarse frequency correction algorithm in accordance with one known in the art for estimating a center frequency error in the received signal and for using the frequency error to adjust the center frequency. This coarse adjustment of center frequency may be effected via a complex mixing operation carried out prior to the sub-channel demodulator bank, or may be subsumed into each sub-channel demodulator's mixing operation. Demodulator 412 may further provide for a coarse timing synchronization algorithm for estimating an appropriate symbol sampling phase for the aforementioned symbol-rate samplers. The coarse timing algorithm is also used to determine the times at which each of the non-data and data symbols will arrive and, thereby, to separate the non-data symbols from the data symbols. Thus the coarse timing synchronization algorithm provides both symbol timing and symbol identification information. While the accuracy of the coarse timing algorithm is usually adequate at the symbol identification level (i.e., the locations and classification of all symbols in the slot can be readily ascertained), the symbol-level timing may not be adequate for the purposes of channel estimation (i.e., adequately centering the channel delay profile within the channel estimator's delay bandwidth). Similarly, while the coarse frequency correction algorithm may be sufficient for demodulation (i.e., identification and separation of sub-channel signals), it may not be adequate for the purposes of channel estimation (i.e., adequately centering the channel Doppler profile within the channel estimator's Doppler bandwidth).

Demodulated symbols 414 comprising both non-data symbols and data symbols are supplied to the fine frequency adjustor 416, which may further adjust the center frequency. The fine frequency adjustor 416 comprises a complex mixing operation wherein the demodulated non-data symbols and data symbols 414 are multiplied by a complex, unit-magnitude phasor adjustment factor whose phase is varied based on the relative position of each symbol in time. An exemplary complex phasor may be described as $$\phi(k) = e^{-j2\pi k \Delta f/f_{symb}} \quad (1)$$

where k is the relative time index for the current symbol (e.g. k=1 for baud 1, k=2 for baud 2, etc.), $\Delta f$ is the frequency error 436, and $f_{symb}$ is the symbol rate. This adjustment factor is the same for all symbols at a given time index across sub-channels. Note that the function of fine frequency adjustor 416 is to compensate for a frequency error as it is manifested at the output of demodulator 414, which manifestation is a linear phase change versus time (i.e., symbol time index).

The non-data symbols and data symbols at the output 418 of the fine frequency adjustor 416 are supplied to the fine timing adjustor 420, which may further adjust the timing information. The fine timing adjustor 420 comprises a complex mixing operation wherein the demodulated and frequency-adjusted non-data symbols and data symbols 418 are multiplied by a complex, unit-magnitude phasor adjustment factor whose phase is varied based on the relative position of each symbol in frequency. An exemplary complex phasor may be described as $$\phi(m) = e^{-j2\pi m \Delta t f_{subch}} \quad (2)$$

where m is the relative sub-channel index for the current symbol (e.g. m=1 for sub-channel 1, m=2 for sub-channel 2), $\Delta t$ is the timing error 440, and $f_{subch}$ is the sub-channel frequency spacing. This adjustment factor is the same for all symbols in a given sub-channel across time. Note that the function of fine timing adjustor 420 is to compensate for a timing error as it is manifested at the output of demodulator 414, which manifestation is a linear phase change versus frequency (i.e., sub-channel index).

It should be noted that the order of the fine frequency adjustor 416 and fine timing adjustor 420 could be reversed in an alternate embodiment of the invention. Alternatively, fine frequency and timing adjustments may be carried out using a single combined phasor such as, for instance, $$\phi(m,n) = e^{-j2\pi(m\Delta t f_{subch} + n\Delta f/f_{symb})} \quad (3)$$

with the mixing operations performed in an arbitrary order.

The data symbols 424 from the fine timing adjustor 420 are supplied to the bit detector 428 that outputs the recovered bits of information 450 transmitted from the transmitter. In addition, the channel estimator 430 receives non-data symbols 426 for use in channel estimation and receives channel characterization information 444 indicating the proper channel estimation filter to use in producing the channel estimates 446. The channel estimation filters within the channel estimator 430 are typically finite impulse response (FIR) filters centered about zero time and/or frequency, although this (centering) is not required. The FIR channel estimation filters have real filter coefficients if they are centered about zero time and/or frequency, and complex coefficients if they are not. The channel estimates 446 are then used in a conventional manner by the bit detector 428 in recovering the transmitted bits.

The frequency estimator 434, the timing estimator 438 and the channel characterizer 442 all receive non-data symbols 432 from the demodulator 412 for performing their functions in accordance with the present invention. The frequency estimator 434 uses the non-data symbols to determine a frequency error 436 that the fine frequency adjustor 416 may use to adjust the center frequency of the received demodulated symbols. The timing estimator 438 uses the non-data symbols to determine a timing error 440 that the fine timing adjustor 420 may use to adjust the timing of the demodulated symbols, for accurate recovery of the transmitted bits. Finally, the channel characterizer 442 may use the non-data symbols for determining a channel Doppler and/or delay spread characterization 444 for use by the channel estimator 430 to produce channel estimates 446.

As detailed above, ideally receiver 400 is implemented using both the fine frequency adjustor 416 (along with the corresponding frequency estimator 434) and the fine timing adjustor 420 (along with the corresponding timing estimator 438). However, it is realized by those of ordinary skill in the art that any one of the frequency adjustor 416 or fine timing adjustor 420, or both, may be implemented in the receiver. Also, channel characterizer 442 may or may not be utilized. Moreover, although the frequency estimator 434 and frequency adjustor 416, the timing estimator 438 and fine timing adjustor 420 and the channel characterizer 442 and channel estimator 430 are shown as boxes in the DSP 410, it is understood that they are ideally implemented algorithmically in software in the DSP. However, it is conceivable that, in another embodiment of the invention, the frequency estimator 434 and frequency adjustor 416, the timing estimator 438 and fine timing adjustor 420 and the channel characterizer 442 and channel estimator 430 may be implemented in hardware.

In an alternate embodiment of the present invention, the functionalities of fine frequency adjustor 416 and fine timing adjustor 422 are subsumed into channel estimator 430. The demodulated non-data symbols and data symbols 414 are passed, unadjusted, directly to the channel estimator 430 and the bit detector 428, respectively. Concomitantly, channel estimator 430 utilizes at least one channel estimation filter which is frequency and/or time adjusted in accordance with frequency error 436 and timing error 440. Thus, in this alternative embodiment, the channel estimation filter, which is typically lowpass in nature, is transformed to a bandpass type filter. The frequency and/or time adjusted channel estimation filters are generated through multiplication of the zero frequency and/or timing centered filter coefficients with the respective unit-magnitude phasor adjustment factors similar to those described in Equations (1) through (3). Although, in this embodiment, the phasors used are the negative of those described in Equations (1) through (3). The functionalities of the frequency estimator 434, timing estimator 438, and channel characterizer 442 may be kept separate from the functionalities of the channel estimator as described above or may alternatively be subsumed into the channel estimator 430.

Figure 5:
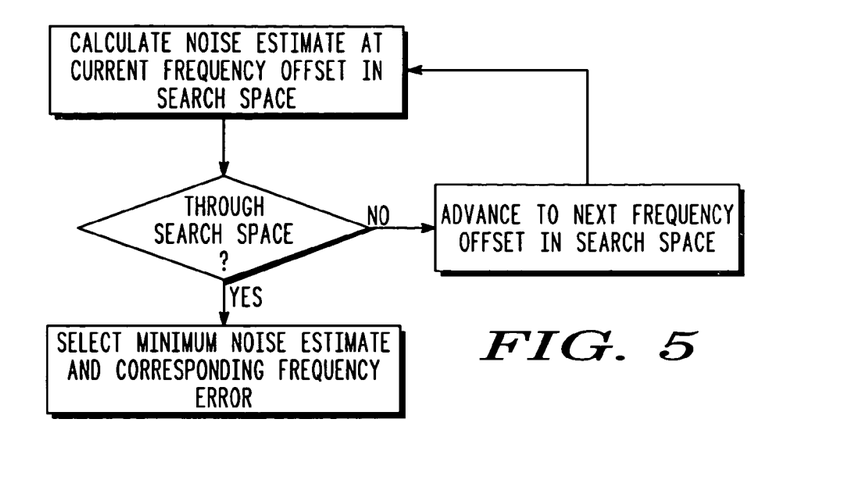
FIG. 5 illustrates a method for automatic frequency error determination in accordance with an embodiment of the present invention.

FIG. 5 illustrates a method for automatic frequency error determination in accordance with an embodiment of the present invention, which may be implemented by the frequency estimator 434. Note that this method may follow a coarse AFC method performed in the demodulator 412 that has already attempted to re-center the baseband signal 406 in frequency. First, a frequency search space must be provided from which to determine a fine tuned frequency error for the received signal. This search space may, for example, be defined based on the maximum expected residual frequency shift of the demodulated non-data symbols and data symbols 414 relative to the channel estimation filter frequency centers in the channel estimator 430. This maximum expected residual frequency shift is typically based on the expected channel conditions and the relative performance of the coarse frequency correction algorithm on such channels.

Once the frequency search space is determined, a noise estimation is calculated for a first frequency offset in the search space, for example the maximum negative frequency error expected. A noise estimation for one or more subsequent offsets in the frequency search space is then calculated until the end of the frequency search space or a stopping criterion (such as upon detection of a local minimum noise estimation value) is reached. The frequency offsets may be uniformly or non-uniformly spaced, and are typically adjacent to each other in the frequency search space. An example search space would be −500 Hz to 500 Hz in 100 Hz steps. It is further understood that the accuracy of the frequency fine tuning is a function of the number of frequency offsets for which a noise estimation is calculated, wherein the greater the number of offsets used, the greater the accuracy. From all of the calculated noise estimates, a minimum noise estimate is determined or selected, wherein the fine tuned frequency error is the frequency offset corresponding to that minimum noise estimation. This fine tuned frequency error 436 may then be used by the fine frequency adjustor 416 to further adjust the center frequency of the received signal.

To calculate the noise estimations, ideally any suitable pilot symbol-based noise estimation algorithm may be used. The noise estimator essentially measures the variance of the difference between the demodulated non-data symbols 432 and the reconstructed signal components thereof. The following shows an exemplary derivation of the noise estimator used for single antenna configurations.

The demodulated non-data symbols 432 can be modeled as:

$$r_i = p_i h_i + n_i \quad (4)$$

where $p_i$, $h_i$, and $n_i$ in general are all complex scalars and $p_i$ is the ith transmitted non-data symbol value, $h_i$ represents the channel response, and $n_i$ the noise (comprising interference and signal distortion in addition to thermal noise).

For a given frequency offset hypothesis $f_{off}$, demodulated symbols 432 are first frequency adjusted in accordance with that particular frequency error hypothesis, as follows:

$$v_i = r_i e^{-j2\pi k_i f_{off}/f_{symb}} \quad (5)$$

where $k_i$ is the relative time index of non-data symbol i. (Recall that frequency adjustments to the demodulated symbols are effected via a linear phase change versus time, i.e., symbol time index).

The noise variance is then estimated as:

$$\sigma^2 = E\{|v_i - p_i \hat{h}_i|^2\} \times \alpha \quad (6)$$

where $\hat{h}_i$ is the channel estimate at non-data symbol location i, and $E\{\ \}$ denotes the expectation or average taken over the entire set of non-data symbols in the slot or a subset thereof. The quantity $p_i \hat{h}_i$ is an estimate of the desired signal component of $v_i$, and their difference is an estimate of the noise component. Since the channel estimates are noisy, the quantity $p_i \hat{h}_i$ will tend to be overestimated, which leads to an underestimate of the noise power. To correct for this, the optional correction factor $\alpha$ is introduced, which will be derived shortly. First we show one possible method of deriving the channel estimates $\hat{h}_i$.

We can model the set of frequency adjusted demodulated non-data symbols utilized in the noise estimate in vector form as $$v = Ph + n \quad (7)$$

where $v = [v_1 v_2 \ldots v_N]^T$ is the vector of N frequency-adjusted demodulated non-data symbols, $P = \text{diag}(p) = \text{diag}([p_1 p_2 \ldots p_N])$ is the diagonal matrix of known, transmitted non-data symbols, $h = [h_1 h_2 \ldots h_N]^T$ is the vector of channel gains ($[\ ]^T$ denoting transpose), and n is the vector of noise samples.

A linear minimum mean-square error estimate of h can be found according to:

$$\hat{h} = R_{hh}(R_{hh} + \rho^{-1} I)^{-1} P^{-1} v; \quad (8)$$

where $R_{hh}$ is the normalized covariance matrix of expected channel gains, $\rho$ is the average received pilot symbol to noise ratio, and I is the Nth order identity matrix. $R_{hh}$ and $\rho$ are design parameters. $R_{hh}$ depends on the anticipated delay/Doppler power profiles, or spectra (i.e., their shapes and bandwidths). Defining $g = P^{-1} v$ as the set of "raw" channel gain estimates ($g_i = v_i / p_i$), and C as the matrix of channel estimation filter coefficients given by:

$$C = R_{hh}(R_{hh} + \rho^{-1} I)^{-1} \quad (9)$$

we have the following method for channel estimation:

$$\hat{h} = CP^{-1} v = Cg. \quad (10)$$

The noise component of v can be estimated by reconstructing and subtracting off the signal component, i.e.:

$$\hat{n} = v - P\hat{h} \quad (11)$$

and then estimating the noise variance by forming $$\sigma^2 = \frac{\alpha}{N} \hat{n}^H \hat{n} \quad (12)$$

where $[\ ]^H$ denotes complex conjugate transpose.

Examining the estimated noise vector in more detail:

$$\begin{aligned}
\hat{n} &= v - P\hat{h} \quad (13)\\
&= v - PCg\\
&= v - PCP^{-1} v\\
&= (I - PCP^{-1})v\\
&= (I - PCP^{-1})(Ph + n)\\
&= (I - PCP^{-1})Ph + (I - PCP^{-1})n.
\end{aligned}$$

In the last line of (13), the first term represents the error due to a mismatch between the multi-path channel characteristics (i.e., delay/Doppler spread along with timing/frequency errors) and the channel estimation filter's delay/Doppler bandwidths. The second term is due to noise. The mismatch error component will typically be small compared to the noise component if the channel estimation filter's bandwidths are adequately wide and/or if the adjustment for the hypothetical frequency offset has adequately centered the channel Doppler spectrum within the filter's passband.

Ignoring the mismatch error component we can proceed as follows:

$$\begin{aligned}
\sigma^2 &= \frac{\alpha}{N} \hat{n}^H \hat{n} \quad (14)\\
&\approx \frac{\alpha}{N} n^H (I - P^{-H} C^H P^H)(I - PCP^{-1}) n\\
&= \frac{\alpha}{N} tr[(I - PCP^{-1}) n n^H (I - P^{-H} C^H P^H)]
\end{aligned}$$

where 'tr' denotes the trace operator. Taking the expectation of both sides yields $$\begin{aligned}
E\{\sigma^2\} &= \frac{\alpha}{N} E\{tr[(I - PCP^{-1}) n n^H (I - P^{-H} C^H P^H)]\} \quad (15)\\
&= \frac{\alpha}{N} tr[(I - PCP^{-1}) E\{n n^H\}(I - P^{-H} C^H P^H)]\\
&= \frac{\alpha \sigma_n^2}{N} tr[(I - PCP^{-1})(I - P^{-H} C^H P^H)]\\
&= \frac{\alpha \sigma_n^2}{N} tr[(I - C)(I - C^H)]
\end{aligned}$$

where $\sigma_n^2$ is the true noise variance, and we have made the reasonable assumption that the noise is white. Finally we can state that, if we want the expected value of the estimated noise variance to equal the true variance (for an unbiased estimate), then the correction factor $\alpha$ must be $$\alpha = \frac{N}{tr[(I - C)(I - C^H)]} \quad (16)$$

Figure 6:
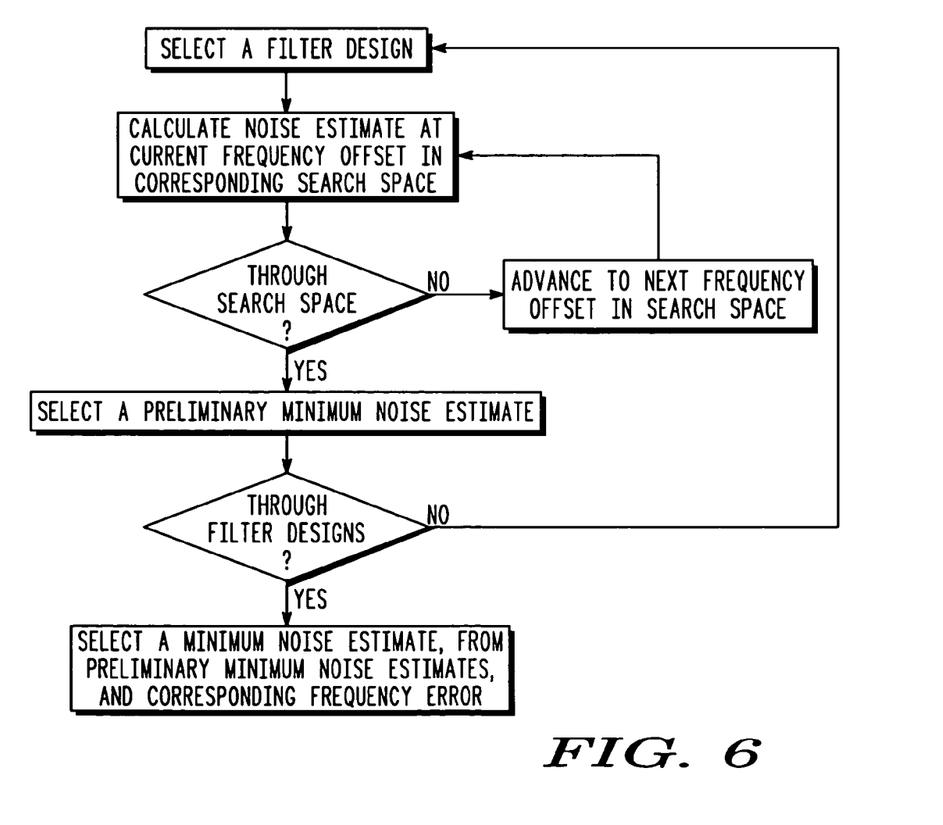
FIG. 6 illustrates a method for frequency error determination and corresponding channel characterization in accordance with an embodiment of the present invention.

FIG. 6 illustrates a method for frequency error determination and corresponding channel characterization in accordance with an embodiment of the present invention. In this embodiment, an AFC algorithm is performed in conjunction with a sensitivity improving adaptive-bandwidth channel estimation algorithm, which may be implemented by the frequency estimator 434 and the channel characterizer 442. Sensitivity improvement can be achieved by using two (or more) channel estimation filters designed to accommodate different channel characteristics, i.e., different Doppler and/or delay spread bandwidths. By using the filter best suited to the channel at a given time, rather than a single filter designed to handle worst-case conditions, channel estimation is improved and performance enhanced. The improvement derives from the fact that narrower filters (in the Doppler or delay dimensions, or both) better attenuate noise and interference. Thus a key to implementation of this embodiment is properly identifying the channel.

In accordance with the embodiment of the invention illustrated in FIG. 6, noise estimates are computed for each of the channel estimation filter designs over their respective search spaces, which may be the same or different. For each filter design, that is, for each channel characterization hypothesis, a preliminary minimum noise estimate is determined. The relative values of these preliminary minimum noise estimates are then weighted and compared and the minimum of these determines the channel characterization 444. The frequency offset corresponding to the selected channel characterization is then the frequency error estimate 436. Mathematically, if the set of preliminary minimum noise estimates for N channel characterizations is $[\sigma_1^2, \sigma_2^2, \ldots \sigma_N^2]$, then the channel characterization 444 and frequency error estimate 436 correspond to the minimum of $[w_1\sigma_1^2, w_2\sigma_2^2, \ldots w_N\sigma_N^2]$. The weight factors w allow the channel characterization to be biased toward use of narrower or wider filter designs, as appropriate. These weight factors may, for instance, be determined through computer simulation.

Figure 7:
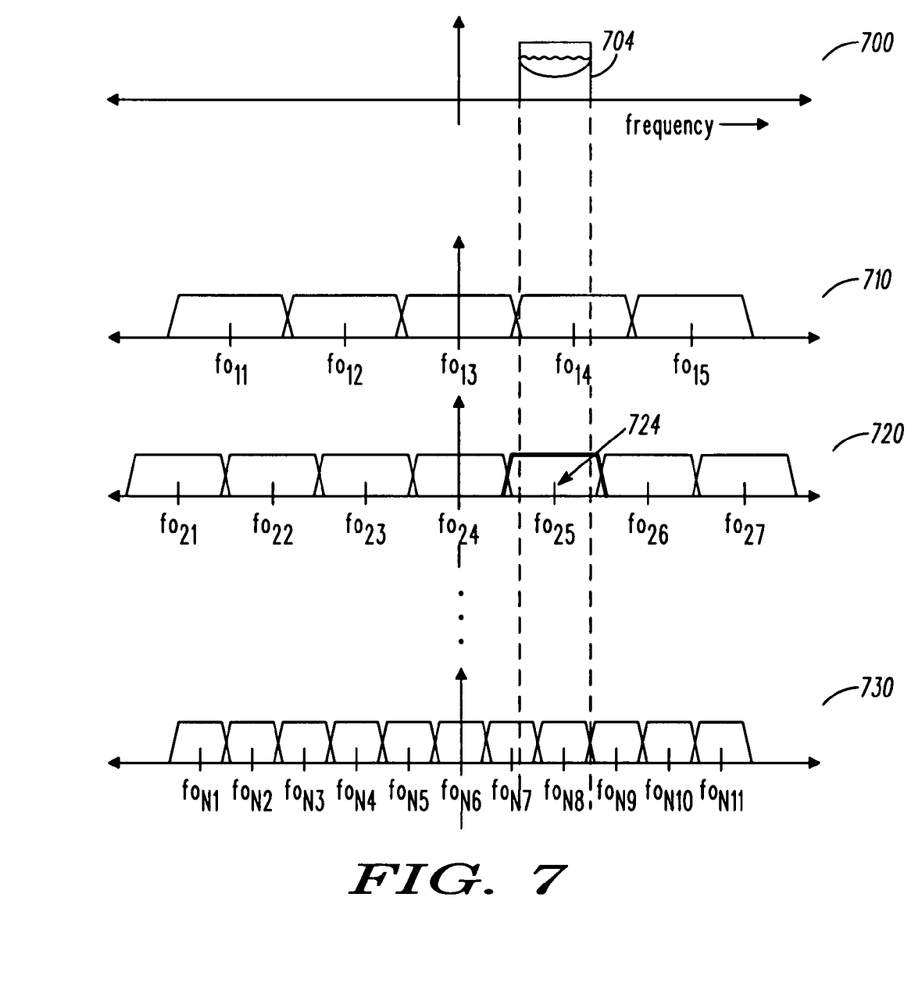
FIG. 7 illustrates a spectral representation of an example frequency offset and channel characterization search.

FIG. 7 illustrates a spectral representation of an example frequency offset and channel characterization search. An example channel Doppler spectrum 704 with a residual frequency offset is shown in axis 700. The remaining axes 710, 720 and 730 illustrate example frequency offset search spaces corresponding to N number of filter designs (i.e., channel characterizations), wherein: axis 710 corresponds to a filter design 1 and illustrates frequency offsets $fo_{11}$, $fo_{12}$, $fo_{13}$, $fo_{14}$ and $fo_{15}$ over which a corresponding preliminary minimum noise estimate may be calculated; axis 720 corresponds to a filter design 2 and illustrates frequency offsets $fo_{21}$, $fo_{22}$, $fo_{23}$, $fo_{24}$, $fo_{25}$, $fo_{26}$ and $fo_{27}$ over which a corresponding preliminary minimum noise estimate may be calculated; and axis 730 corresponds to a filter design N and illustrates frequency offsets $fo_{N1}$, $fo_{N2}$, $fo_{N3}$, $fo_{N4}$, $fo_{N5}$, $fo_{N6}$, $fo_{N7}$, $fo_{N8}$, $fo_{N9}$, $fo_{N10}$ and $fo_{N11}$ over which a corresponding preliminary minimum noise estimate may be calculated. Note that axes 710, 720, and 730 illustrate channel estimation filters that are frequency adjusted, or translated, to each of the offsets in their respective search spaces (i.e. band-pass versions of the typically low-pass filters). This conceptually represents the frequency translation of the signal by each offset followed by filtering with a zero-centered channel estimation filter. With correctly designed selection criterion (i.e., the above weighting factors), filter design 2 and corresponding frequency offset 724 would be selected. This offset 724 is then, accordingly, the fine frequency error estimate 436, and filter design 2 would be the channel characterization 444 used for subsequent channel estimation. Note that by virtue of the mismatch error component in the estimated noise quantity of Equation 13, the noise estimate will sharply rise when the frequency error hypothesis, or the channel characterization hypothesis, is incorrect.

As can be further seen in FIG. 7, the frequency search space and the magnitude of the frequency offsets used may be different for each of the channel characterizations. For instance in FIG. 7, the frequency offset step size should ideally be successively decreased moving from the widest filter design 1 to the narrowest filter design N.

Figure 8:
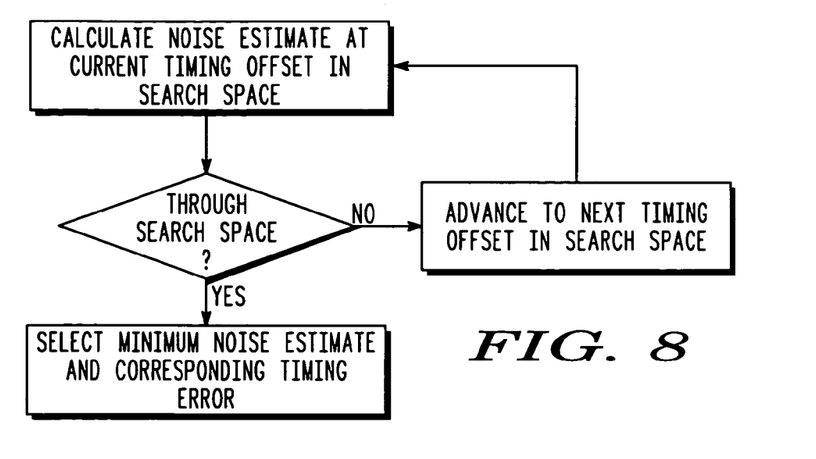
FIG. 8 illustrates a method for automatic timing error determination in accordance with an embodiment of the present invention.

FIG. 8 illustrates a method for automatic timing error determination in accordance with an embodiment of the present invention, which may be implemented by the timing estimator 438. Note that this method may follow a coarse timing synchronization algorithm performed in the demodulator 412 that has already attempted to re-center the baseband signal 406 in time. First, a timing offset search space must be provided from which to determine a fine tuned timing error for the received signal. This search space may, for example, be defined based on the maximum expected residual timing shift of the demodulated non-data symbols and data symbols 414 relative to the channel estimation filter timing centers in the channel estimator 430. This maximum expected residual timing shift is typically based on the expected channel conditions and the relative performance of the coarse timing synchronization algorithm on such channels.

Once the timing offset search space is determined, a noise estimation is calculated for a first timing offset in the search space, for example the maximum negative timing error expected. A noise estimation for one or more subsequent offsets in the timing offset search space is then calculated until the end of the timing offset search space or a stopping criterion (such as upon detection of a local minimum noise estimation value) is reached. Each of the timing offsets may be uniformly or non-uniformly spaced, and are typically adjacent to each other in the timing search space. An example search space would be −100 μs to 100 μs in 20 μs steps.

In carrying out these noise estimation steps, for each timing offset hypothesis $t_{off}$, demodulated symbols 432 are first time adjusted in accordance with that particular timing error hypothesis, using:

$$v_i = r_i e^{-j2\pi m_i t_{off} f_{subch}} \quad (17)$$

where $m_i$ is the relative sub-channel index of non-data symbol i. (Recall that timing adjustments to the demodulated symbols are effected via a linear phase change versus frequency, i.e., sub-channel index). It is further understood that the accuracy of the timing fine tuning is typically a function of the number of timing offsets for which a noise estimation is calculated, wherein the greater the number of offsets used, the greater the accuracy. From all of the calculated noise estimates, a minimum noise estimate is determined or selected, wherein the fine tuned timing error 440 is the timing offset corresponding that the minimum noise estimation. This fine tuned timing error 440 may then be used by the fine timing adjustor 420 to further adjust the timing synchronization of the received signal.

Figure 9:
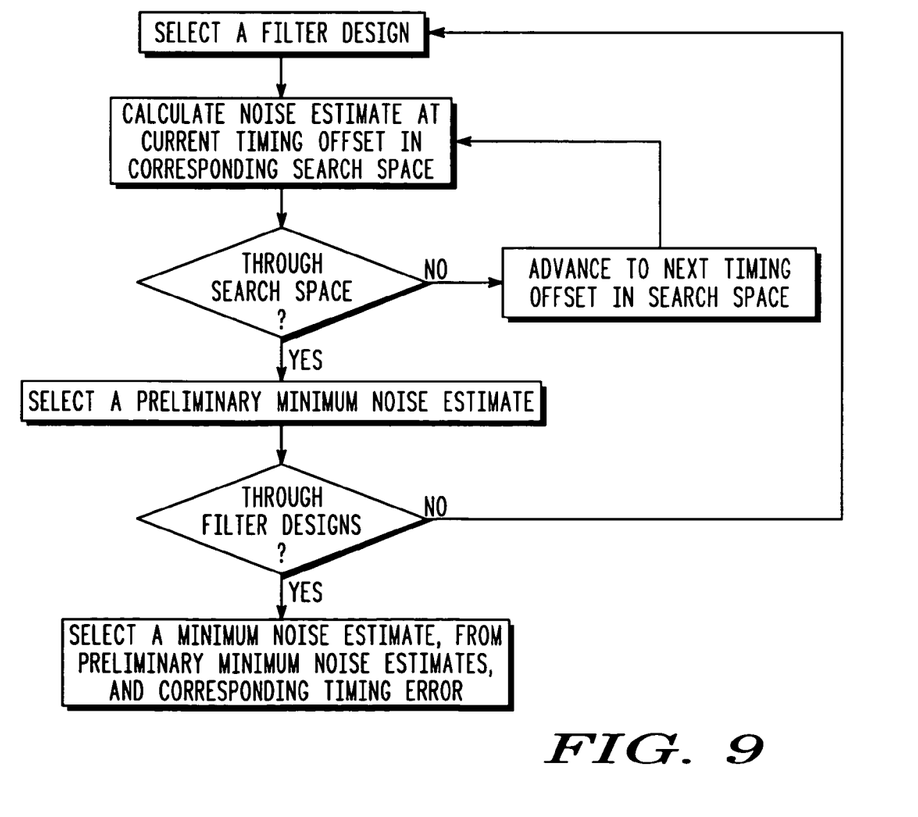
FIG. 9 illustrates a method for timing error determination and corresponding channel characterization in accordance with an embodiment of the present invention.

FIG. 9 illustrates a method for timing error determination and corresponding channel characterization in accordance with an embodiment of the present invention. In this embodiment, a timing error correction algorithm is performed in conjunction with the sensitivity improving adaptive-bandwidth channel estimation algorithm as described above, which may be implemented by the timing estimator 438 and the channel characterizer 442. In accordance with this embodiment, noise estimates over the timing search space are computed for at least two different channel characterizations, wherein each channel characterization corresponds to a different combined Doppler and delay spread hypothesis. For each channel characterization, a preliminary minimum noise estimate is determined. The relative values of these preliminary minimum noise estimates are then weighted and compared and the minimum of these determines the channel characterization 444. The timing offset corresponding to the selected channel characterization is then the timing error estimate 440.

Figure 10:
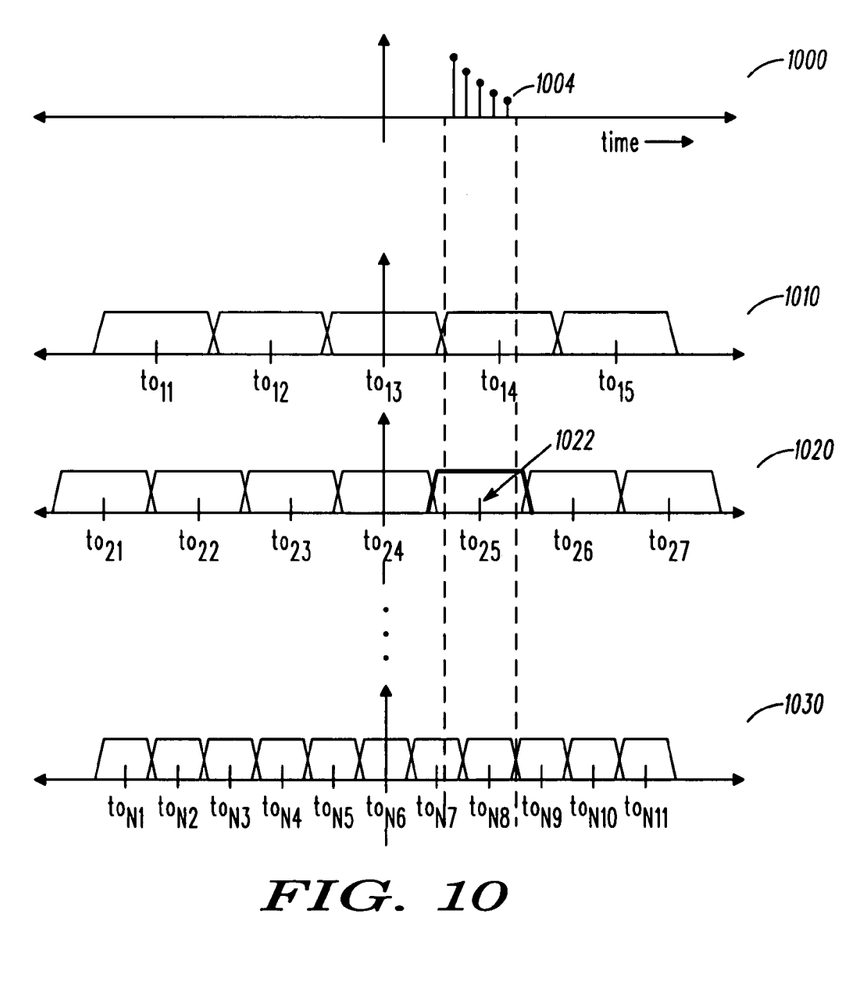
FIG. 10 illustrates a timing representation of an example timing offset and channel characterization search.

FIG. 10 illustrates a timing representation of an example timing offset and channel characterization search. An example channel delay profile 1004 with a residual timing offset is shown in an axis 1000. The remaining axes 1010, 1020 and 1030 illustrate example timing offset search spaces corresponding to N number of filter designs (i.e., channel characterizations), wherein: axis 1010 corresponds to a filter design 1 and illustrates timing offsets $to_{11}$, $to_{12}$, $to_{13}$, $to_{14}$ and $to_{15}$ over which a corresponding preliminary minimum noise estimate may be calculated; axis 1020 corresponds to a filter design 2 and illustrates timing offsets $to_{21}$, $to_{22}$, $to_{23}$, $to_{24}$, $to_{25}$, $to_{26}$ and $to_{27}$ over which a corresponding preliminary minimum noise estimate may be calculated; and axis 1030 corresponds to a filter design N and illustrates timing offsets $to_{N1}$, $to_{N2}$, $to_{N3}$, $to_{N4}$, $to_{N5}$, $to_{N6}$, $to_{N7}$, $to_{N8}$, $to_{N9}$, to $_{N10}$ and to $_{N11}$ over which a corresponding preliminary minimum noise estimate may be calculated. Note that axes 1010, 1020, and 1030 illustrate channel estimation filters that are adjusted, or translated, in time to each of the offsets in their respective search spaces. This conceptually represents the time translation of the signal by each offset followed by filtering with a zero time-centered channel estimation filter. With correctly designed switching criterion, filter design 2 and corresponding timing offset 1022 for would be selected. This offset 1022 is then the fine timing error estimate 440, and filter design 2 would be the channel characterization 444 used for subsequent channel estimation.

As can be further seen in FIG. 10, the timing search space and the time duration of the timing offsets used may be different for each channel characterization. For instance in FIG. 10, the timing offset durations should ideally be decreased moving from the widest filter design 1 to the narrowest filter design N.

Figure 11:
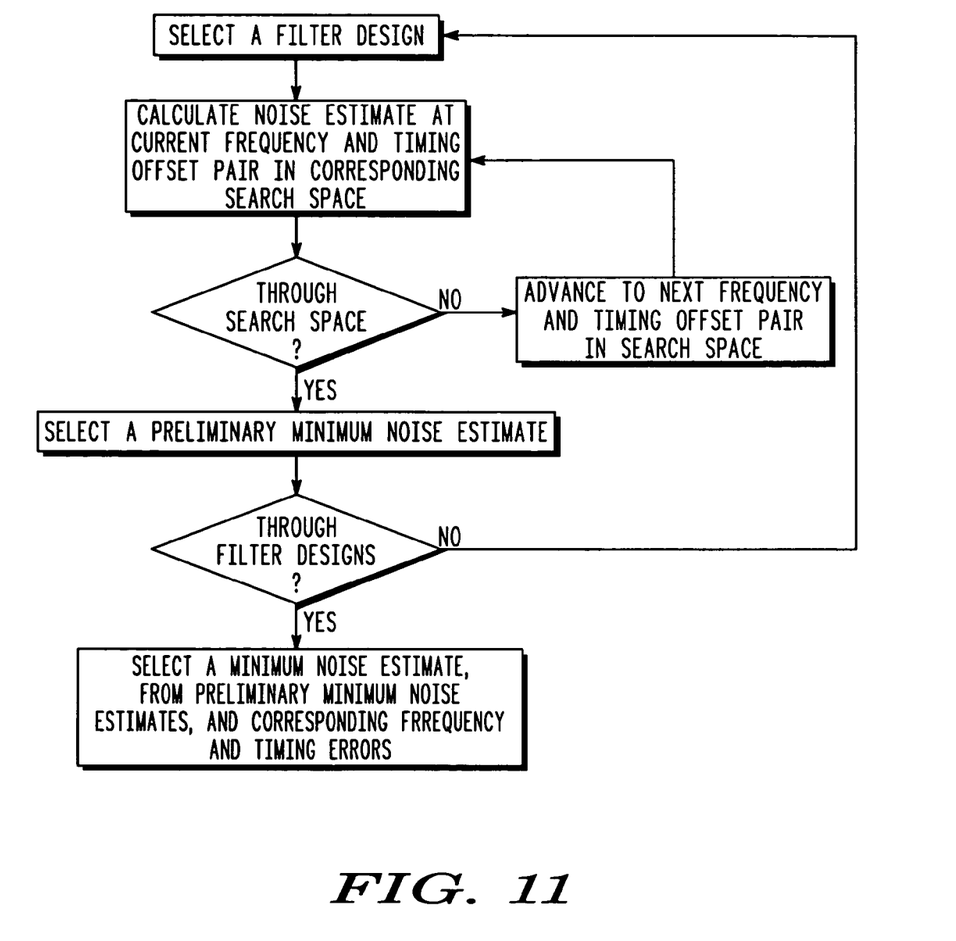
FIG. 11 illustrates a method for timing and frequency error determination and corresponding channel characterization in accordance with an embodiment of the present invention.

FIG. 11 illustrates a method for timing and frequency error determination and corresponding channel characterization in accordance with an embodiment of the present invention. In this embodiment, AFC and timing error correction algorithms are performed in conjunction with the sensitivity improving adaptive-bandwidth channel estimation algorithm as described above, which may be implemented by the frequency estimator 434, the timing estimator 438 and the channel characterizer 442. In accordance with this embodiment of the invention, noise estimates over a combined timing and frequency search space are computed for at least two different channel characterizations. Each element in this combined search space consists of unique pairs of time and frequency offset hypotheses. For each channel characterization, a preliminary minimum noise estimate is determined. The relative values of these preliminary minimum noise estimates are then weighted and compared and the minimum of these determines the channel characterization 444. The timing offset corresponding to the selected channel characterization is then the timing error estimate 440, and the frequency offset corresponding to the selected channel characterization is the frequency error estimate 436. Moreover, it is understood that in an alternative embodiment of the invention, the combined timing and frequency error determination illustrated by reference to FIG. 11 may, similarly, be performed for a single filter.

While the invention has been described in conjunction with specific embodiments thereof, additional advantages and modifications will readily occur to those skilled in the art. The invention, in its broader aspects, is therefore not limited to the specific details, representative apparatus, and illustrative examples shown and described. Various alterations, modifications and variations will be apparent to those skilled in the art in light of the foregoing description. For instance, the functionalities of the fine frequency adjustor 416 and fine timing adjustor 420 could be subsumed into demodulator 412. Thus, it should be understood that the invention is not limited by the foregoing description, but embraces all such alterations, modifications and variations in accordance with the spirit and scope of the appended claims.

What is claimed is:

1. A method for determining a frequency error over at least one frequency search space for a received signal, the method comprising the steps of:

a) calculating a first noise estimation for a first frequency offset in a frequency search space;

b) calculating at least a second noise estimation for a second frequency offset in said frequency search space; and c) determining a minimum noise estimation from said calculated noise estimations, wherein said frequency error is the frequency offset corresponding to said minimum noise estimation.

2. The method of claim 1 further comprising the step of using said determined frequency error to perform a frequency adjustment.

3. The method of claim 2, wherein said received signal has a center frequency and said frequency error is used to adjust said center frequency.

4. The method of claim 2, wherein said signal is received into a receiver having a channel estimation filter, and said channel estimation filter is frequency adjusted using said frequency error.

5. The method of claim 1 further comprising:

performing steps a) and b) for a first channel characterization over a first frequency search space and determining a corresponding first preliminary minimum noise estimation;

performing steps a) and b) for at least a second channel characterization over a second frequency search space and determining a corresponding second preliminary minimum noise estimation; and selecting the minimum noise estimation from said preliminary minimum noise estimations.

6. The method of claim 5, wherein each said channel characterization is based on at least one of a different Doppler hypothesis and a different delay spread hypothesis.

7. The method of claim 5, wherein the minimum noise estimation is selected based on weighting each of the preliminary noise estimations and comparing the weighted preliminary noise estimations.

8. The method of claim 5 further comprising selecting a channel estimation filter design based on the channel characterization corresponding to said selected minimum noise estimation.

9. The method of claim 1, wherein each of the frequency offsets are uniformly spaced and are adjacent to each other in the frequency search space.

10. The method of claim 1 further for determining a timing synchronization error for said received signal over at least one combined frequency and timing search space, wherein:

said first noise estimation is calculated for a first frequency and timing offset pair in a combined frequency and timing search space; and said at least a second noise estimation is calculated for a second frequency and timing offset pair in said combined frequency and timing search space; and said timing error is the timing offset corresponding to said minimum noise estimation.

11. A method for determining a timing synchronization error over at least one timing search space for a received signal, the method comprising the steps of:

a) calculating a first noise estimation for a first timing offset in a timing search space;

b) calculating at least a second noise estimation for a second timing offset in said timing search space; and c) determining a minimum noise estimation from said calculated noise estimations, wherein said timing error is the timing offset corresponding to said minimum noise estimation.

12. The method of claim 11 further comprising the step of using said determined timing error to perform a timing adjustment.

13. The method of claim 12, wherein said received signal is time adjusted using said timing error.

14. The method of claim 12, wherein said signal is received into a receiver having a channel estimation filter, and said channel estimation filter is time adjusted using said frequency error.

15. The method of claim 11 further comprising:
performing steps a) and b) for a first channel characterization over a first timing search space and determining a corresponding first preliminary minimum noise estimation;
performing steps a) and b) for at least a second channel characterization over a second timing search space and determining a corresponding second preliminary minimum noise estimation; and
selecting the minimum noise estimation from said preliminary minimum noise estimations.

16. The method of claim 15, wherein each said channel characterization is based on at least one of a different Doppler hypothesis and a different delay spread hypothesis.

17. The method of claim 15, wherein the minimum noise estimation is selected based on weighting each of the preliminary noise estimations and comparing the weighted preliminary noise estimations.

18. The method of claim 15 further comprising selecting a channel estimation filter design based on the channel characterization corresponding to said selected minimum noise estimation.

19. The method of claim 11, wherein each of the timing offsets are uniformly spaced and are adjacent to each other in the timing search space.

20. A method for determining a frequency error and a timing synchronization error over at least one combined frequency and timing search space for a received signal; the method comprising the steps of:
a) calculating a first noise estimation for a first frequency and timing offset pair in a combined frequency and timing search space;
b) calculating at least a second noise estimation for a second frequency and timing offset pair in said combined frequency and timing search space; and
c) determining a minimum noise estimation from said calculated noise estimations, wherein said frequency error is the frequency offset corresponding to said minimum noise estimation, and said timing error is the timing offset corresponding to said minimum noise estimation.

21. A method for determining a frequency error over at least one frequency search space for a received signal, the method comprising the steps of:
for a first channel characterization over a first frequency search space,
calculating a first noise estimation for a first frequency offset in said first frequency search space;
calculating at least a second noise estimation for a second frequency offset in said first frequency search space; and
determining a corresponding first preliminary minimum noise estimation from said calculated noise estimations;
for at least a second channel characterization over a second frequency search space,
calculating a first noise estimation for a first frequency offset in said second frequency search space;
calculating at least a second noise estimation for a second frequency offset in said second frequency search space; and
determining a corresponding second preliminary minimum noise estimation from said calculated noise estimations; and
selecting a minimum noise estimation from said preliminary minimum noise estimations, wherein said frequency error is the frequency offset corresponding to said minimum noise estimation.

22. A method for determining a timing synchronization error over at least one timing search space for a received signal, the method comprising the steps of:
for a first channel characterization over a first timing search space,
calculating a first noise estimation for a first timing offset in said first timing search space;
calculating at least a second noise estimation for a second timing offset in said first timing search space; and
determining a corresponding first preliminary minimum noise estimation from said calculated noise estimations;
for at least a second channel characterization over a second timing search space,
calculating a first noise estimation for a first timing offset in said second timing search space;
calculating at least a second noise estimation for a second timing offset in said second timing search space; and
determining a corresponding second preliminary minimum noise estimation from said calculated noise estimations; and
selecting a minimum noise estimation from said preliminary minimum noise estimations, wherein said timing error is the timing offset corresponding to said minimum noise estimation.

23. A method for determining a frequency error and a timing synchronization error over at least one combined frequency and timing search space for a received signal, the method comprising the steps of:
for a first channel characterization over a first combined frequency and timing search space,
calculating a first noise estimation for a first frequency and timing offset pair in said first combined frequency and timing search space;
calculating at least a second noise estimation for a second frequency and timing offset pair in said first combined frequency and timing search space; and
determining a corresponding first preliminary minimum noise estimation from said calculated noise estimations;
for at least a second channel characterization over a second combined frequency and timing search space,
calculating a first noise estimation for a first frequency and timing offset pair in said second combined frequency and timing search space;
calculating at least a second noise estimation for a second frequency and timing offset pair in said second combined frequency and timing search space; and
determining a corresponding second preliminary minimum noise estimation from said calculated noise estimations; and
selecting a minimum noise estimation from said preliminary minimum noise estimation, wherein said frequency error is the frequency offset corresponding to said minimum noise estimation and said timing error is the timing offset corresponding to said minimum noise estimation.

* * * * *